(12) United States Patent
Smith et al.

(10) Patent No.: US 7,178,850 B2
(45) Date of Patent: Feb. 20, 2007

(54) TETHERED FASTENER APPARATUS AND METHOD

(75) Inventors: Michael Walter Smith, Lake Zurich, IL (US); Mark Fleydervish, Buffalo Grove, IL (US); Joseph W. Lowry, Libertyville, IL (US); Edward Sacha, Chicago, IL (US); Daniel James Dickinson, Arlington Heights, IL (US)

(73) Assignee: Termax Corporation, Lake Zurich ( * ) Notice: Subject to any disclaimer, the term of this patent is extended or adjusted under 35 U.S.C. 154(b) by 96 days.

(21) Appl. No.: 10/906,209

(22) Filed: Feb. 9, 2005

(65) Prior Publication Data
US 2006/0290155 A1 Dec. 28, 2006

(51) Int. Cl.
*B62D 27/00* (2006.01)

(52) U.S. Cl. .............................. 296/29; 24/297; 24/295

(58) Field of Classification Search ................. 296/29, 296/187.05, 187.06, 39.1, 1.08; 280/728.1, 280/728.2, 733; 24/297, 453, 295
See application file for complete search history.

(56) References Cited
U.S. PATENT DOCUMENTS

| | | | | |
|---|---|---|---|---|
| 5,772,258 A | * | 6/1998 | Dyer et al. ............... | 24/16 PB |
| 6,053,527 A | * | 4/2000 | Gans et al. ............... | 280/728.3 |
| 6,431,585 B1 | * | 8/2002 | Rickabus et al. ......... | 24/114.05 |
| 2005/0212321 A1 | * | 9/2005 | Yamamoto ............... | 296/65.03 |
| 2005/0246870 A1 | * | 11/2005 | Dickenson et al. .......... | 24/295 |
| 2006/0032029 A1 | * | 2/2006 | Nessel et al. ................. | 24/289 |
| 2006/0032030 A1 | * | 2/2006 | Nessel et al. ................. | 24/297 |
| 2006/0064166 A1 | * | 3/2006 | Zucherman et al. ... | 623/17.011 |

* cited by examiner

Primary Examiner—Kiran B. Patel

(57) ABSTRACT

A tether fastening device includes a tether clip and a strap to couple a first engagement structure, such as a vehicle chassis, and a second engagement structure, such as a body panel. The strap is coupled to the tether clip and couples the first engagement structure with the second engagement structure to allow for controlled detachment. When attached, the tether clip fastens the first engagement structure with the second engagement structure. For example, the tether clip and first engagement structure may detach from the second engagement structure; however, the strap controls the acceleration, speed and distance displaced between the first engagement structure and the second engagement structure. According to one embodiment, the tether clip may further include a tether cap integrated with the strap and a fastener clip operative to couple to the tether cap.

10 Claims, 4 Drawing Sheets

TETHERED FASTENER APPARATUS AND METHOD

The invention relates generally to devices for fastening objects, and, more particularly, to a tethered fastener device for insertion into an engagement structure, such as a vehicle chassis, a hollow substrate, a wall, a plate or any suitable surface.

BACKGROUND OF THE INVENTION

A number of devices and fasteners are currently available for fastening panels, such as body panels and automobile interior trimpieces, to the chassis of a vehicle. As used herein, a panel refers to, for example, any body panel, a plastic interior trimpiece or an interior trimpiece made out of any suitable material, such as wood, steel, aluminum, magnesium, carbon fiber or any suitable material. Additionally, the panel may be any suitable exterior body panel, such as a fender, bumper, quarter panel or door panel. The chassis of the vehicle may include any substrate, plate, body panel, structural framework, chassis component or subcomponent, wall or any suitable object.

However, with the advent of airbags placed throughout the interior of a vehicle, body panels and interior trimpieces must also function in various ways, such as detaching in a safe, controlled manner, in order to safely facilitate deployment of these various airbags. For example, side curtain airbags or airbags that traverse down a window or along one chassis pillar to another chassis pillar typically travel from a storage position within the body panel along a predetermined path, in order to fully deploy the airbag and to protect occupants during a crash. Other types of airbags, such as "sausage-type" airbags and side curtain airbags, may operate in a similar fashion to protect the head as well as the chest region. As a result, these various body panels must safely disengage or detach from the vehicle chassis in a controlled manner in order to permit the airbag to, for example, deploy from within the body panel. Additionally, these body panels typically detach to permit the airbag to travel along the vehicle chassis via a strap or tether in a guided fashion, as is known in the art. Yet another requirement is that the body panel, when detached, does not itself become ballistic in nature and thus pose a danger to the vehicle occupants. Tether straps not integrated with the body panel fastener are known to be used to attach the body panel or interior trimpiece to the vehicle chassis in order to control the displacement of the interior trimpiece when detached. According to this method, one end of the tether strap is attached to an interior trimpiece, such as the B-pillar trimpiece cover, while the other end is attached to the B-pillar.

However, attaching a tether strap between the interior trimpiece and the vehicle chassis has proved disadvantageous. For example, when the interior trimpiece is fastened to the chassis during vehicle assembly, manual insertion of the interior trimpiece to the vehicle chassis requires attaching a separate tether strap between the interior trimpiece and the vehicle chassis. As a result, a two-step process for attaching the body panel to the chassis is required, including the additional step of attaching the tether strap within the confines of the body panel and the vehicle chassis. These tether straps increase assembly costs, and therefore increase production costs, leading to higher vehicle prices because of the increased amount of labor involved when installing the tether straps between the interior trimpiece and the vehicle chassis. Further, the requirement for the separate installation of a tether strap between the interior trimpiece and the vehicle chassis further increases the likelihood of an inadvertent failure to properly attach the tether strap between the interior trimpiece and the vehicle chassis during assembly. If the tether strap is not properly installed, the interior trimpiece may detach in an uncontrolled manner and possibly come in contact with the vehicle passengers.

BRIEF DESCRIPTION OF THE DRAWINGS

The present invention is illustrated by way of example and not limitation in the accompanying figures, in which like reference numerals indicate similar elements, and in which.

DETAILED DESCRIPTION OF THE PREFERRED EMBODIMENTS

A tether fastening device includes a tether clip and a strap to couple a first engagement structure, such as a vehicle chassis, and a second engagement structure, such as a body panel. The strap is coupled to the tether clip and couples the first engagement structure with the second engagement structure to allow for controlled detachment. When attached, the tether clip fastens the first engagement structure with the second engagement structure. For example, the tether clip and first engagement structure may detach from the second engagement structure; however, the strap controls the acceleration, speed and distance displaced between the first engagement structure and the second engagement structure. According to one embodiment, the tether clip may further include a tether cap integrated with the strap and a fastener clip operative to couple to the tether cap.

Among other advantages, the tether fastening device easily facilitates attachment of the first engagement structure with the second engagement structure, while an integrated strap controls detachment of the first engagement structure from the second engagement structure. Since the tether clip includes an integrated strap, a body panel assembly may be preassembled with the strap and tether clip already attached and ready for attachment to a vehicle chassis in a single step. As a result, no separate step of attaching a tether strap to the vehicle is required. Since the tether strap is integrated into the tether clip and delivered to, for example, an automobile manufacturer for final assembly, the automobile manufacturer may eliminate the step of attaching the strap to the vehicle chassis, since the tether strap is already integrated into the tether clip. Consequently, assembly costs are reduced, thus reducing a manufacturer's production costs. Further, the tether fastening device reduces or eliminates the chance of an improper attachment of the tether strap between the first engagement structure and the second engagement structure, since the tether strap is already integrated with the tether clip at one end and is already attached to the second engagement structure, such as a body panel. In other words, the problem of inadvertently failing to attach the separate tether strap between the first engagement structure and the second engagement structure is greatly reduced or even eliminated. The tether strap facilitates controlled disengagement of the second engagement structure and the first engagement structure in order to permit deployment of an airbag, permitting the airbag to travel along a guided path that would otherwise be obstructed by the second engagement structure. Consequently, the use of the tether fastening device decreases production cost and increases productivity and efficiency while further increasing reliability and safety.

Figure 1:
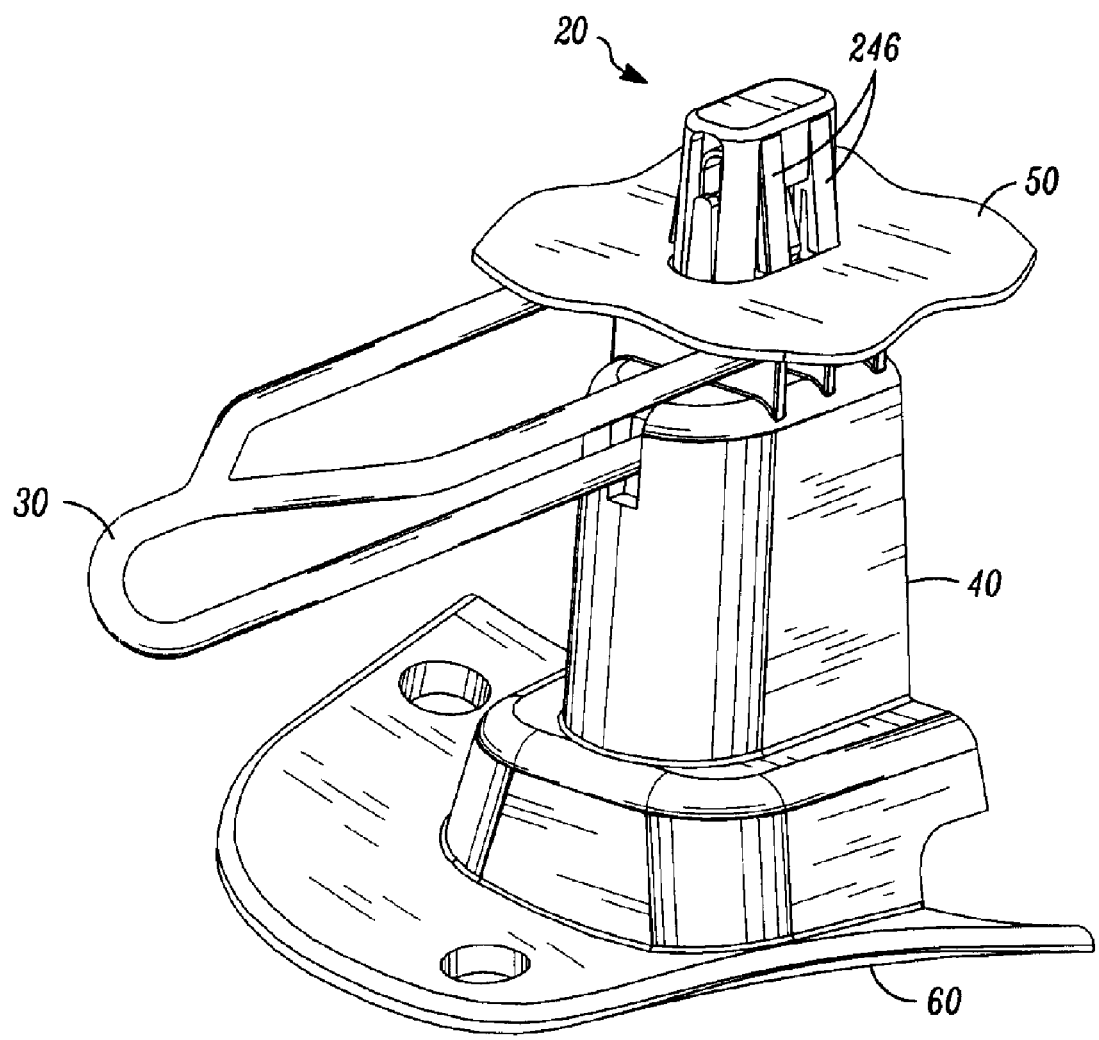
FIG. 1 is a perspective view of a body panel assembly in accordance with an exemplary embodiment of the present invention.

FIG. 1 is a perspective view of a body panel assembly 10, including a tether clip 20, a tether strap 30, and an engagement structure 40, such as a tower or post portion of a body panel. The engagement structure 40 may be part of a plastic trimpiece, a body panel or any other suitable type of panel. The engagement structure 40 may be made out of plastic, carbon fiber, fiberglass, steel, aluminum, magnesium, leather, rubber, wood or any other suitable type of material. According to one embodiment, the engagement structure 40 may be a plastic trimpiece cover for a B-pillar in a vehicle chassis and may be made of polyvinyl chloride or any other suitable type of plastic as is known in the art. The engagement structure 40, the tether clip 20 and the strap tether 30 may couple or otherwise suitably attach to another engagement structure, such as a vehicle chassis, structural framework, body panel, wall, substrate or any other suitable object. The tether strap 30 and the tether clip 20 may also be made of polyvinyl chloride or any suitable plastic, though any other suitable material, such as carbon fiber, wire or cable, may be used. It should be understood that the implementation of other variations and modifications of the tether fastener assembly 10 and its various aspects shown in the figures and described herein will be apparent to those having ordinary skill in the art, and that the invention is not limited by these specific embodiments described. For example, the tether clip 20 and tether strap 30 may be coupled to the engagement structure 40 in any suitable manner. For example, the tether strap 30 may be coupled to the engagement structure 40 on a side of the engagement structure 40 or on any part of the engagement structure 40 or body panel 60, such as on an interior trimpiece inner surface, or any part of the tower or post, such as the base 244, as is known in the art. Typically, an A-pillar refers to the first pillar at the front of a vehicle (i.e., to a windshield pillar). A B-pillar refers to the second pillar from the front of the vehicle. A C-pillar refers to a third pillar from the front of the vehicle, if applicable, and so on.

Figure 2:
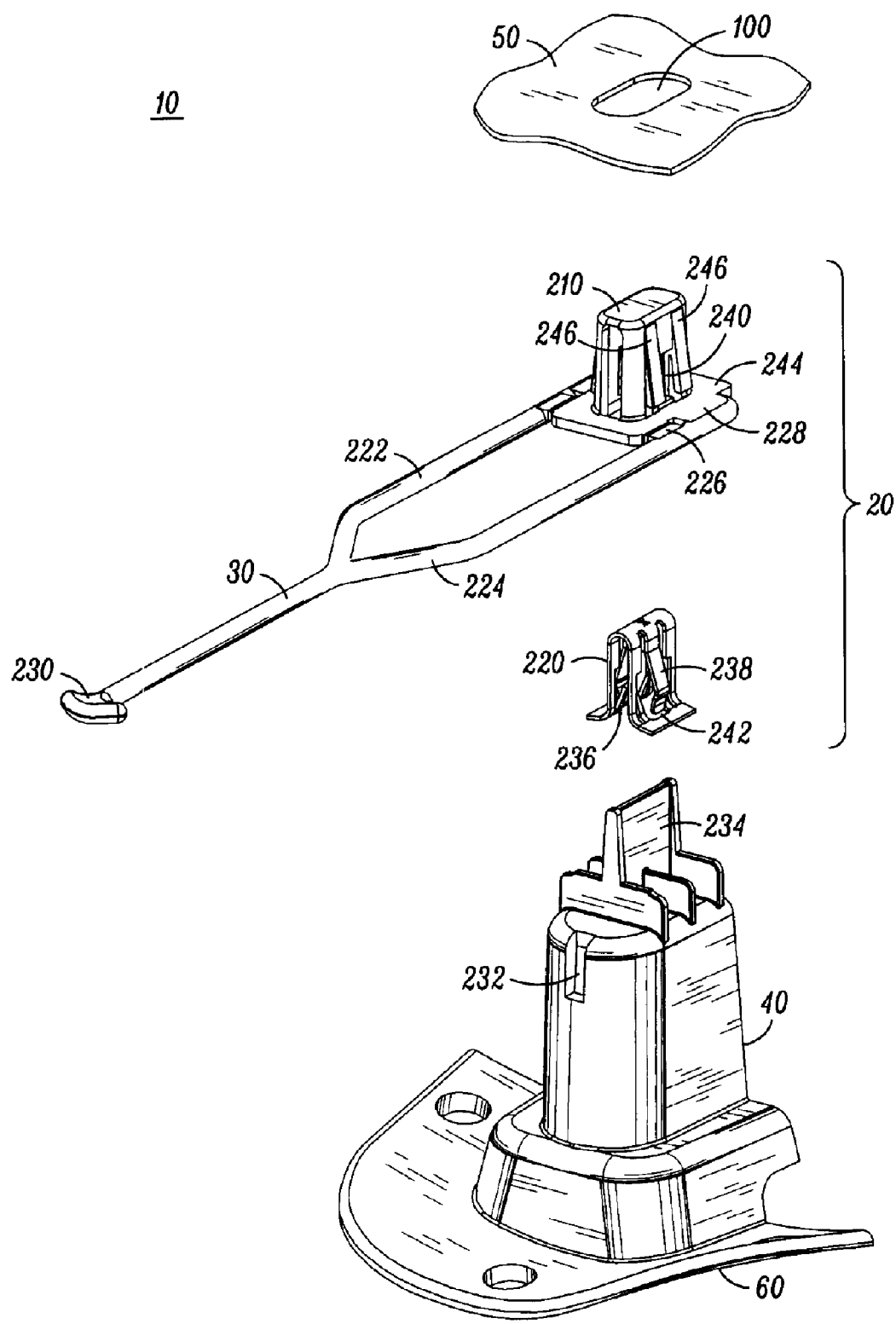
FIG. 2 is a top exploded view of the body panel assembly according to one embodiment of the present invention.

FIG. 2 shows an exploded view of the tether fastener assembly 10 according to one embodiment of the invention. According to one embodiment, the tether clip 20 further includes a tether cap 210 and a fastener clip 220. The tether cap 210 may be integrated with the tether strap 30 as shown in FIG. 2. The tether strap 30, for example, may be integrated with arms 222, 224 for suitable attachment with the tether cap 210 via base 244. According to one embodiment, the tether strap 30 attaches to the tether cap 210 via at least two arms, 222 and 224, for example via base 244, although a single arm or three or more arms are contemplated. For example, the tether strap 30 may be coupled to the tether cap 210 via a web 226, 228 coupling to the base of the tether cap 210 along either one side, two sides, three sides or all four sides of the base 244 of tether cap 210. As a result, the tether strap 30 may have any suitable amount of material, including portions of varying thickness, such as the web 226, 228, or alternatively an externally applied object or device, such as a chain, cable or metal strap, sufficient to sustain any desired amount of detachment force.

According to one embodiment, each of the arms 222, 224 may attach to the tether cap 210 via a frangible portion 226 and a strengthened portion 228. For example, when the engagement structure 40 detaches from the engagement structure 50, such as the vehicle chassis, the detachment force may be absorbed by tearing the frangible portion 226 such that the strengthened portion 228 suitably maintains coupling between the tether strap and the tether cap 210. The frangible portion 226 may include a shock absorber, a tear-away portion and a weakened portion or any other suitable mechanism for absorbing all or a portion of the energy due to detachment of the engagement structure 50 from the engagement structure 40. According to one embodiment, the engagement structure 40 detaches from the engagement structure 50 in response to the impact of a vehicle collision. Therefore, the strengthened portion 228 may include a sufficient amount of material, such as molded plastic, in order to ensure that the first engagement structure 50 and the second engagement structure 40 remain coupled via the tether strap 30.

Tether strap 30 further includes a tether strap coupler 230 at one end of the tether strap 30. The tether strap coupler 230 is suitably coupled to a strap slot 232 formed on the engagement structure 40. According to the embodiment shown in FIG. 2, the tether strap coupler 230 and the strap slot 232 are orthogonally positioned such that the tether strap coupler 230 may be inserted into the strap slot 232 and, when rotated, the tether strap coupler 230 will resist removal from the strap slot 232. Although the tether strap coupler 230 is shown as having the general outline of a T-bar, the tether strap coupler 230 may take the form or shape of any suitable shape, such as a ball, an arrow, a triangle, a square and/or a hook, for complementary engagement within the strap slot 232. The strap slot 232 may be adapted to accept insertion of the tether strap coupler 230 while resisting detachment of the tether strap coupler 230 from the strap slot 232.

The tether clip 20, according to one embodiment including the tether cap 210 and the fastener clip 220, is attached to tower 234 of engagement structure 40. For example, the tether cap 210, fastener clip 220 and body panel 60 may be preassembled for suitable assembly with the first engagement structure 50, such as the A-, B- or C-pillar or any suitable pillar of an automobile chassis as is known in the art, via hole 236. The hole 236 may be sized to allow relatively easy insertion of the tether cap 210 while resisting separation between the tether cap 210 and the first engagement structure 50. The hole may have any shape, such as a circle, a square, a rectangle, a pentagon, a hexagon, a polygon, an n-sided polygon where n is a whole number, an ellipse, and/or an oval, or any suitable shape.

According to one embodiment, the fastener clip 220 attaches to tower 234 of engagement structure 40. The fastener clip includes one or more prongs 236 positioned to allow relatively easy insertion onto the tower 234. The one or more prongs 236 may be angled with a sufficient amount of springing action to cause the prongs 236 to compress or dig into tower 234 in order to resist removal of the fastener clip 220 from the tower 234. A tip of prong 236 may be bent to further frictionally engage or dig into tower 234 as, better explained, for example, in U.S. Pat. Nos. 6,279,207 and 6,691,380, the prongs 236 are referred to as "barbs".

The fastener clip 220 includes a pair of tangs 238 to engage the tether cap 210 in a tang slot 240 in the tether cap 210. According to one embodiment, the tang 238 includes a notch or depression 242 suitable to increase an extraction force for the fastener clip 220 from the tether cap 210 relative to an insertion force. The tang 238 may be sized to suitably engage hole 100 of the first engagement structure 50 in order to further increase the extraction force. According to one embodiment, the tang 238 may comprise a depression formed on tang 238. For example, the notch or depression 242 may be formed by stamping one or more tangs 238 to form the notch 242. The notch 242 may further include an edge, which may include an abrupt angle, a single angle, multiple angles, continuously changing angles or any suitable size angle in order to permit relatively easy insertion of the fastener clip 220 into the tether cap 210 while increasing the extraction force. The notch 242 may be formed such that any angle may be employed, including 0°, 30°, 45°, 60°, 89°, 145°, and so on.

The tether cap 210 and the fastener clip 220 provides an uncoupling force of from at least 20 to 50 lbs. such that, during an impact, the body panel 60 suitably detaches from the first engagement structure 50 by the tether strap 30. The fastener clip 220 may be any suitable fastener clip, well known to the art, and may be any clip manufactured by Termax Corporation of Schaumburg, Ill. According to one embodiment, the fastener clip 220 may be fastener clip part number 30611 manufactured by Termax Corp. of Schaumburg, Ill. or any suitable clip. In general, preferable clips are the ones described in U.S. Pat. No. 6,718,599, which is incorporated herein by reference. In this patent the tangs 238 are referred to as engagement springs. Any component of the tether fastener assembly 10 may be, for example, molded or extruded or formed from any suitable method from plastic or any suitable material. Alternatively, any component of the tether fastener assembly 10 may be made from a strip of steel metal on a progressive die. The steps employed may include the formation of shear tabs and punches to form holes and channels as is known in the art. Additionally, rubber, plastic, paint or any suitable coating or covering may be applied in order to reduce buzzing, squeaking and rattling (BSR) during operation of the vehicle.

Figure 3:
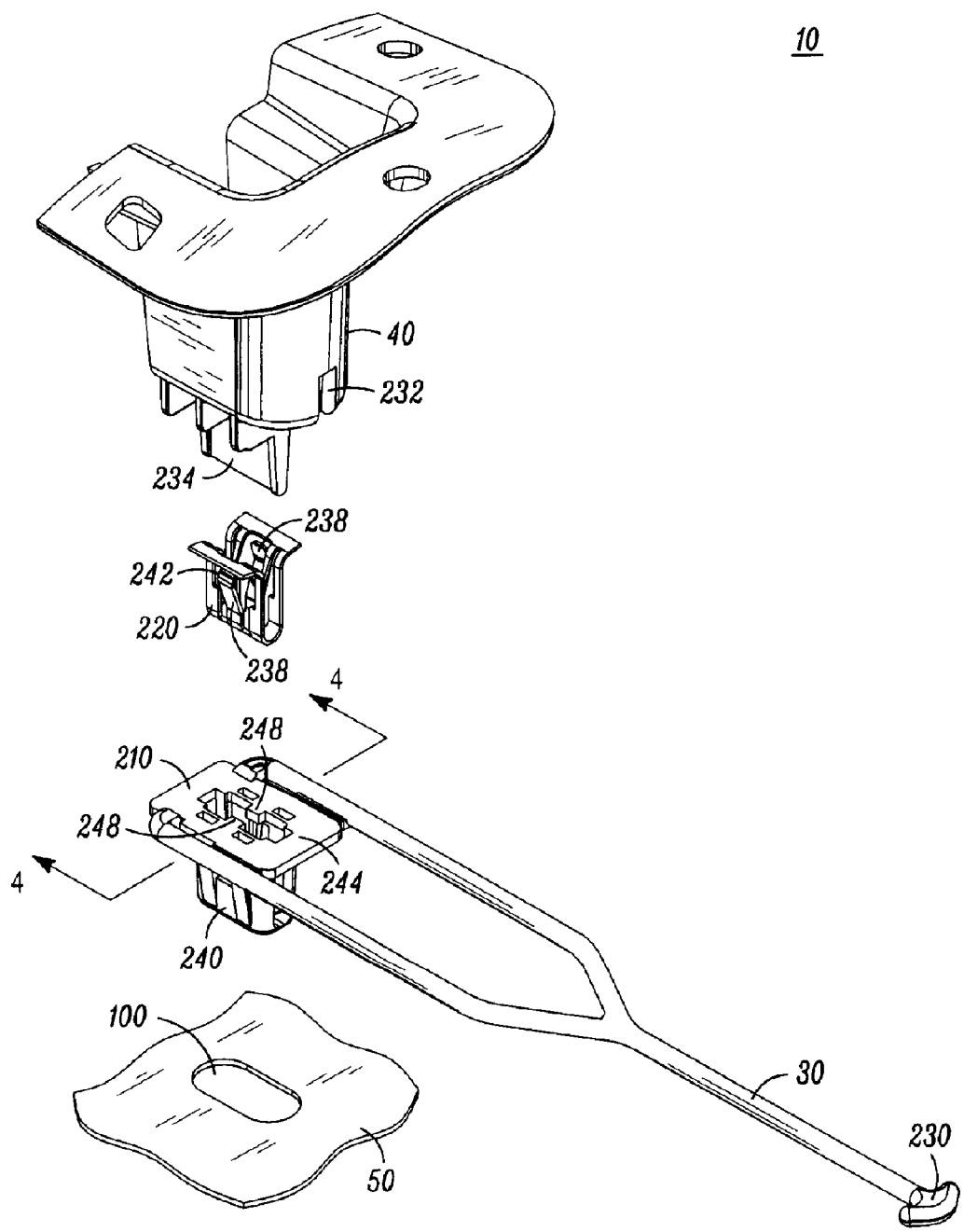
FIG. 3 is a bottom exploded view of the body panel assembly according to one embodiment of the invention.
Figure 4:
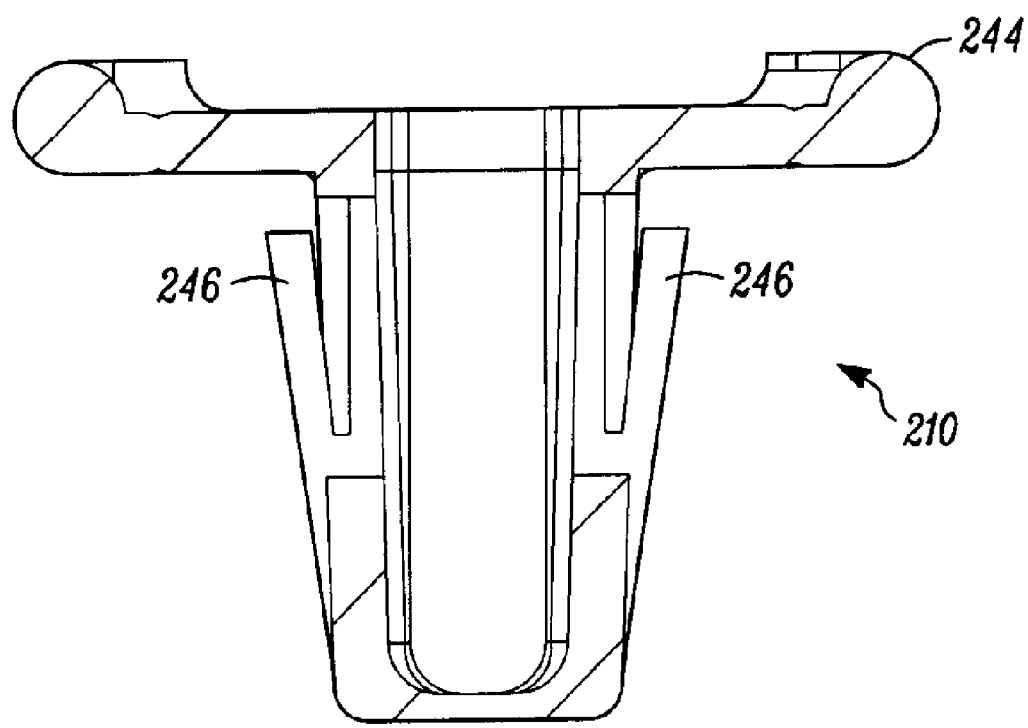
FIG. 4 is a side view of a tether cap according to one embodiment of the invention.

FIG. 3 shows a bottom view of the tether fastener assembly 10 according to one embodiment of the invention. According to this embodiment, the base 244 of the tether cap 210 includes tether retention tabs 248. According to this embodiment, the tether retention tabs 248 retain the fastener clip 220 by engaging notches 242 of the fastener clip 220. For example, when the fastener clip 220 is engaged in the tether cap 210, the tangs 238 spring inward while in frictional engagement with the tether retention tabs 248 until the fastener clip 220 is fully inserted into the tether cap 210. Once fully inserted, the tangs 238 expand via springing action to engage the tether retention tabs 248. For example, the tang 238 may engage the tether retention tab 248 via the notch 242, as previously described. Further, the frictional engagement between the tether retention tab 248 and the notch 242 on the tang 238 may be sufficient to allow relatively easy insertion while increasing relative force for extracting the fastener clip 220 from the tether cap 210.

According to one embodiment, the tether strap 30 permits the first engagement structure 50 and the second engagement structure 40 to separate a distance of preferably approximately 100 mm. However, the displacement between the first engagement structure 50 and the second engagement structure 40 may be any distance range, preferably, including 50 to 150 mm, 25 to 175 mm and 10 to 500 mm or any other suitable distance. Further, the tether cap 210 and the fastener clip 220 detach in response to preferably a minimum uncoupling force of from 20 to 50 lbs., 10 to 100 lbs. and/or 5 to 200 lbs., or any suitable uncoupling force.

Among other advantages, the tether fastening device easily facilitates attachment of the first engagement structure with the second engagement structure, while an integrated strap controls detachment of the first engagement structure from the second engagement structure. Since the tether clip includes an integrated strap, a body panel assembly may be preassembled with the strap and tether clip already attached and ready for attachment to a vehicle chassis in a single step. As a result, no separate step of attaching a tether strap to the vehicle is required. Since the tether strap is integrated into the tether clip and delivered to, for example, an automobile manufacturer for final assembly, the automobile manufacturer may eliminate the step of attaching the strap to the vehicle chassis, since the tether strap is already integrated into the tether clip. Consequently, assembly costs are reduced, thus reducing a manufacturer's production costs. Further, the tether fastening device reduces the chance of an improper attachment of the tether strap between the first engagement structure and the second engagement structure, since the tether strap is already integrated with the tether clip at one end and is already attached to the second engagement structure, such as a body panel. In other words, the problem of inadvertently failing to attach the separate tether strap between the first engagement structure and the second engagement structure is greatly reduced or even eliminated. The tether strap facilitates controlled disengagement of the second engagement structure and the first engagement structure in order to permit deployment of an airbag, permitting the airbag to travel along a guided path that would otherwise be obstructed by the second engagement structure. Consequently, the use of the tether fastening device decreases production costs and increases productivity and efficiency while further increasing reliability and safety. One skilled in the art would readily recognize the use of the tether fastening device in other applications such as aircraft, space craft, boating, furniture, as well as in home construction.

It is understood that the implementation of other variations and modifications of the present invention in its various aspects will be apparent to those of ordinary skill in the art and that the invention is not limited by the specific embodiments described. It is therefore contemplated to cover by the present invention any and all modifications, variations or equivalents that fall within the spirit and scope of the basic underlying principles disclosed and claimed herein.

What is claimed is:

1. A tether fastening device comprising:
(a) a tether clip, operably coupled to a first engagement structure;
a strap having a first end coupled to the tether clip; and
a second end disposed at a distal end of the tether clip, wherein the second end comprises a strap coupler and operably attaches to a second engagement structure.

2. The tether fastening device of claim 1 wherein the second end includes at least one of: a ball, an arrow, a T-bar, a diamond, a triangle, a square and a hook, for complementary engagement within a strap slot in the second engagement structure.

3. The tether fastening device of claim 1 wherein the second end includes a strengthened portion operative to attach to the second engagement structure.

4. The tether fastening device of claim 1 wherein the first end of the strap includes at least one of: a shock absorber, a frangible portion, a tear-away portion, a strengthened portion and a weakened portion, operative to detach a corresponding portion of the strap from the tether clip.

5. The tether fastening device of claim 1 wherein the first end of the strap includes at least two arms coupled to the tether clip.

6. The tether fastening device of claim 1 wherein the first engagement structure includes a portion of a vehicle chassis and the second engagement structure includes a portion of a body panel.

7. The tether fastening device of claim 1 wherein the tether clip further includes:
 (a) a tether cap attached to the strap and operative to couple to the first engagement structure, wherein the tether cap has an interior portion; and
 (b) a fastener clip operably disposed in the interior of the tether cap and operative to couple to the second engagement structure.

8. The tether fastening device of claim 7 wherein the tether cap and the fastener clip operably couple the first engagement structure and the second engagement structure when in an attached mode, and the tether cap is detached from the fastener clip when in a detached mode, such that the tether cap remains coupled to the first engagement structure and the fastener clip remains coupled to the second engagement structure.

9. The tether fastening device of claim 8 wherein the tether cap and the fastener clip detach in response to an uncoupling force of at least one of: at least 20 to 50 lbs., 10 to 100 lbs. and 5 to 200 lbs., and wherein the strap permits the first engagement structure and the second engagement structure to separate a distance of at least one of: 50 to 150 mm, 25 to 175 mm and 10 to 500 mm.

10. The tether fastening device of claim 7 wherein the fastener clip includes a pair of tangs operative to engage the tether cap, wherein each tang includes a notch operative to increase an extraction force for the fastener clip relative to an insertion force.

* * * * *